US006920006B2

(12) United States Patent
Chiba

(10) Patent No.: US 6,920,006 B2
(45) Date of Patent: Jul. 19, 2005

(54) CONNECTION CONTROL CIRCUIT AND INFORMATION STORAGE APPARATUS

(75) Inventor: Makoto Chiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 308 days.

(21) Appl. No.: 10/106,082

(22) Filed: Mar. 26, 2002

(65) Prior Publication Data

US 2003/0039050 A1 Feb. 27, 2003

(30) Foreign Application Priority Data

Aug. 22, 2001 (JP) ........................................ 2001-251505

(51) Int. Cl.[7] .............................................. G11B 15/18
(52) U.S. Cl. ........................................ 360/69; 360/51
(58) Field of Search ......................... 360/69, 53, 97.02, 360/51; 711/186; 714/4; 370/222, 258, 395.61; 710/314; 368/156; 327/63, 67; 439/350; 333/125

(56) References Cited

U.S. PATENT DOCUMENTS

| | | | | |
|---|---|---|---|---|
| 5,329,173 A | * | 7/1994 | Murakami et al. ............. 327/63 |
| 5,357,491 A | * | 10/1994 | Yamasaki .................... 368/156 |
| 5,938,465 A | * | 8/1999 | Fox, Sr. ....................... 439/350 |
| 5,961,624 A | * | 10/1999 | Takayama ..................... 710/314 |
| 5,991,891 A | * | 11/1999 | Hahn et al. ...................... 714/4 |
| 6,055,225 A | * | 4/2000 | Wu ............................ 370/222 |
| 6,055,228 A | * | 4/2000 | DeKoning et al. ............. 370/258 |
| 6,259,697 B1 | * | 7/2001 | Tatsukawa ............. 370/395.61 |
| 6,459,306 B1 | * | 10/2002 | Fischer et al. ................. 327/67 |
| 6,498,541 B2 | * | 12/2002 | Den Besten et al. ........ 333/125 |

* cited by examiner

Primary Examiner—David Hudspeth
Assistant Examiner—Fred F. Tzeng
(74) Attorney, Agent, or Firm—Greer, Burns & Crain, Ltd.

(57) ABSTRACT

A connection control circuit having the function of controlling connection and disconnection of an information storage apparatus to and from a transmission line is constructed such that it uses a comparator to determine whether or not the level of operating clock signal output from a controller of the information storage apparatus is within a predetermined range, and if it is detected that the level of the operating clock signal departs from the predetermined range, the connection control circuit outputs a control signal to a by-pass circuit to disconnect the information storage apparatus from the transmission line loop. This enables the information storage apparatus to be disconnected from the loop even if the controller of the information storage apparatus does not function normally due to an abnormality of the clock or an abnormality of the power supply.

5 Claims, 5 Drawing Sheets

CONNECTION CONTROL CIRCUIT AND INFORMATION STORAGE APPARATUS

BACKGROUND OF THE INVENTION

1. Field of the Invention

The present invention relates to a fiber channel arbitrated loop (generally abbreviated to FC-LA) technology, and more particularly to a technology for avoiding system breakdown, when a component failure occurs in an information storage apparatus, such as a magnetic disk apparatus, on a FC-AL configuration, by disconnecting the relevant apparatus from the loop-like transmission path.

2. Description of the Related Art

FC-AL technology has been increasingly utilized for realizing a high speed interface between an information storage apparatus, such as a magnetic disk apparatus, or the like and a host computer. FC-AL technology is a technology which enables high speed data transfer to be carried out by serially transferring data without giving rise to any skew between different data.

In order for a reader to better understand problems associated with a system using conventional FC-AL technology, the construction of a system using conventional FC-AL technology will be described below with reference to FIG. 1 that will be described in the section, "BRIEF DESCRIPTION OF THE DRAWINGS".

In FIG. 1, a schematic view depicting the construction of a system using FC-AL technology is shown.

As shown in FIG. 1, a host computer 2 and a plurality of magnetic disk apparatuses 3 are connected to the transmission line loop 1. The host computer is not limited to a single unit, and multiple units may be connected.

The host computer 2 and each of the magnetic disk apparatuses 3 are connected to the loop 1 via ports 6. Each of the ports 6 is provided with a driver 4 and a receiver 5. Each apparatus is connected in the form of a loop with its driver 4 connected to the receiver 5 of the port 6 of the apparatus in the following stage. Although, for the sake of simplicity, only one port is provided in each apparatus of the system shown in the Figure, a plurality of ports may be provided in an apparatus so as to form a plurality of loops.

Corresponding to each port, a by-pass circuit 7 is additionally provided. Depending on a control signal (loop enable signal) transmitted from a hard disk controller (HDC) (not shown) of the magnetic disk apparatus, each by-pass circuit 7 selects either the signal transferred from the apparatus in the preceding stage or a signal output from its own driver 4 as the signal to be sent out to the apparatus in the following stage. The loop enable signal is transmitted to the by-pass circuit 7 through a dedicated signal line 8. When a failure occurs in a magnetic disk apparatus 3, the HDC of the relevant magnetic disk apparatus 3 detects it and cancels the loop enable signal accordingly. In response to this cancellation of the loop enable signal, the by-pass circuit 7 selects the signal input from the apparatus in the preceding stage, and the magnetic disk apparatus 3 in which the failure occurs is thereby by-passed.

As has been described above, transmission of the control signal to the by-pass circuit 7 at the time of occurrence of a failure is performed by the HDC. However, when trouble occurs in a reference clock generator or a power supply, the HDC itself cannot function normally. In this case, the loop enable signal is not properly sent out so that the failed magnetic disk apparatus remains on the loop. In such a state, unexpected data are transferred to other magnetic disk apparatuses connected to the loop, leading to a breakdown of the loop.

SUMMARY OF THE INVENTION

It is a first object of the present invention to resolve the above described problem and to avoid the breakdown of the system due to an abnormality of any apparatus connected to the transmission line and to improve the reliability of the system.

It is a second object of the present invention to enable disconnection of the relevant apparatus from the transmission line, even when an abnormality occurs that cannot be monitored by a controller, such as an abnormality in the reference clock generator or an abnormality in the power supply.

The present invention provides a connection control circuit (that is, a loop control circuit) which comprises a comparator for comparing the level of an operating clock signal of a controller of an information storage apparatus with a threshold level and, based on a result of the comparison, generates a connection control signal for connection of the information storage apparatus to the transmission line.

Usually, when abnormality occurs in an information storage apparatus connected to the transmission line, the controller detects an abnormality and sends a control signal for disconnecting the relevant apparatus from the transmission line. However, when an abnormality such as non-output of a clock signal or departure from a normal frequency occurs, the controller of the information storage apparatus itself cannot function normally, and there is a possibility that the information storage apparatus cannot be disconnected from the transmission line.

Therefore, the present invention provides the above-described connection control circuit which, even if an abnormality occurs in the clock, is able to detect the abnormality, in place of the controller. When the abnormality occurs in the clock, the level of the clock signal deviates from a predetermined range, and the connection control circuit according to the present invention is able to detect this deviation and control the by-pass circuit to be operated accordingly. Thus, even if controller has become unable to operate normally, the failed information storage apparatus can be disconnected from the transmission line so that other apparatuses connected to the transmission line are not affected by the abnormality of the clock.

In the present invention, the abnormality of the clock can be detected as an abnormality of voltage level by converting the clock signal to a DC signal by means of a low-pass filter.

As described before, the cause of the abnormality of the clock includes a failure of the reference clock generator. When the reference clock generator fails, the clock has a frequency different from the normal frequency of the clock. Therefore, by adjusting the cut-off frequency of the low pass filter, the abnormality of the clock can be reliably detected.

Another cause of the abnormality of the clock may be a failure of the power supplied to the controller. When the power supply fails, the level of the clock signal may be lowered, or the clock signal may not be generated at all. Thus, by monitoring the clock, an abnormality of the power supply can be detected. Since the controller cannot operate normally in the event of failure of the power supply, the present invention is also useful when power supply fails. It should be noted that, in order to detect failure of the power supply to the controller, the source of power (power supply)

to the comparator of the connection control circuit needs to be different from the power supply to the controller.

BRIEF DESCRIPTION OF THE DRAWINGS

The above objects and features of the present invention will become more apparent from the following description of the preferred embodiments with reference to the accompanying drawings, wherein.

DESCRIPTION OF THE PREFERRED EMBODIMENTS

The construction and operation of preferred embodiments of the present invention will be described below with reference to the accompanying drawings (FIGS. 2 to 6).

Figure 1:
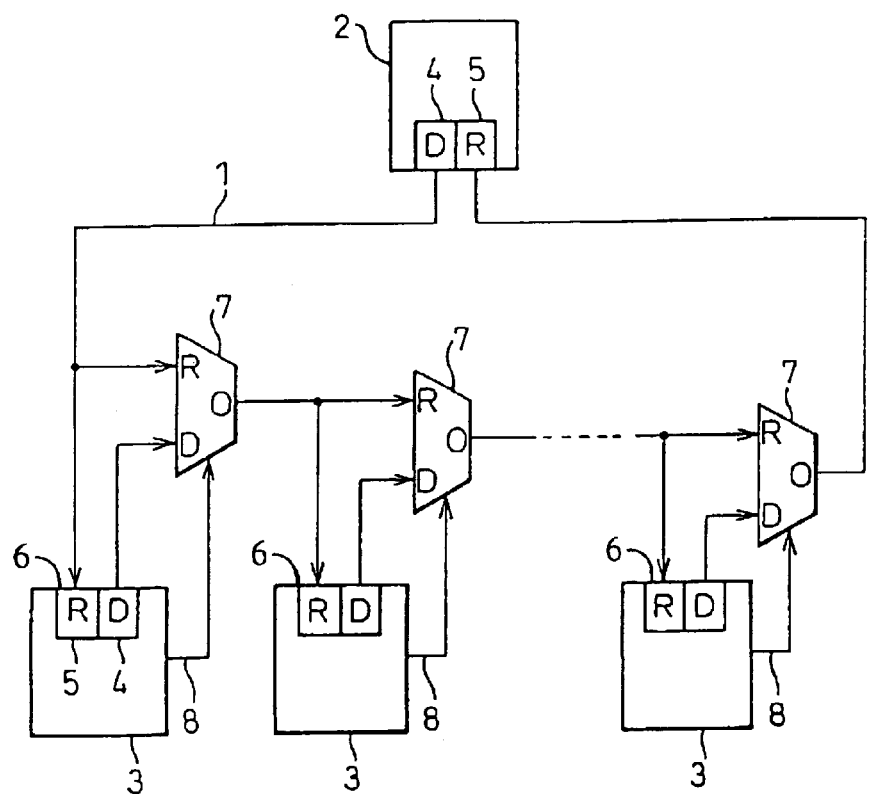
FIG. 1 is a schematic view showing a system using FC-AL.
Figure 2:
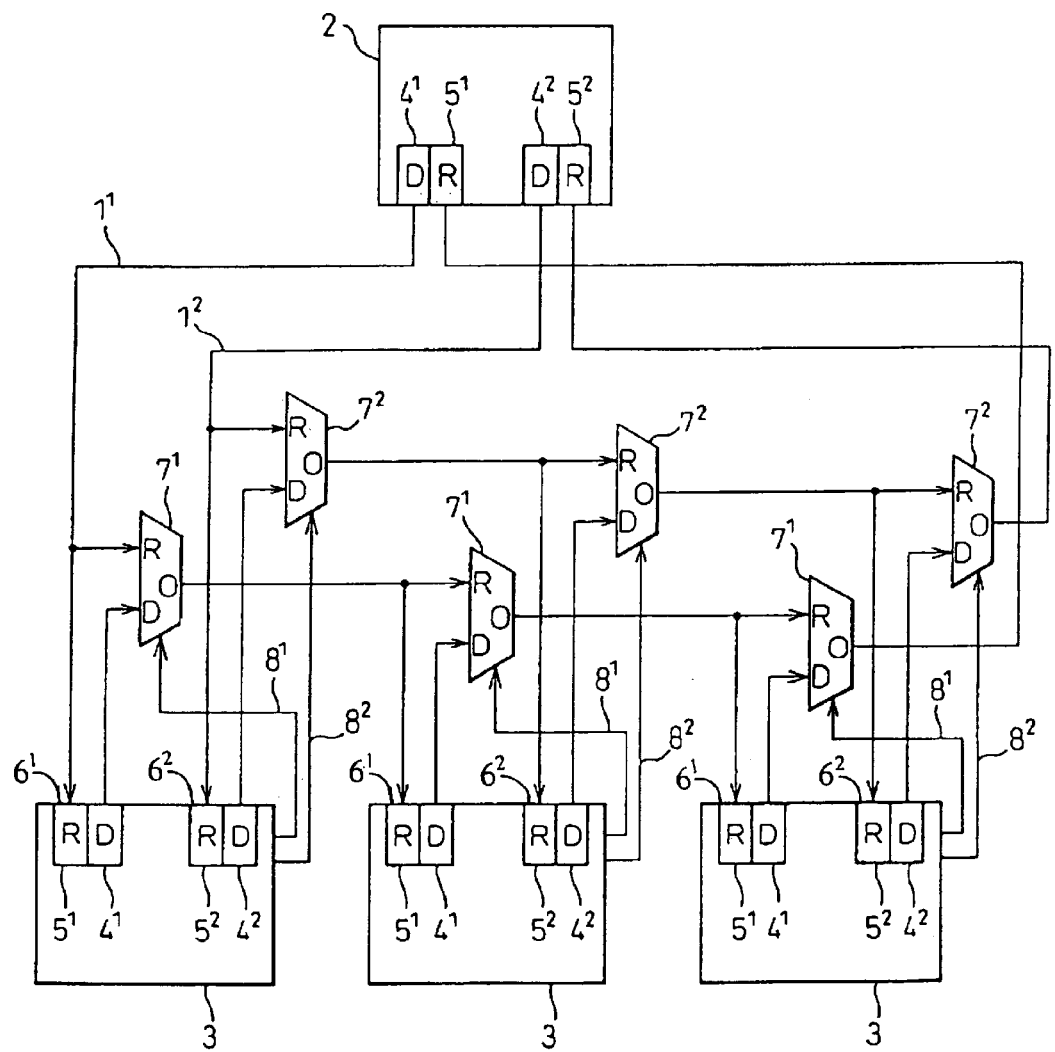
FIG. 2 is a view showing a system using FC-AL according to an embodiment of the present invention.

FIG. 2 is a view showing the schematic construction of a system using FC-AL in a connection control circuit according to an embodiment of the present invention.

In FIG. 2, a host computer 2 and a plurality of magnetic disk apparatuses 3 are connected to the loop $1^1$ and loop $1^2$ of transmission lines. The host computer 2 writes data into a magnetic disk (not shown in this Figure) contained in the magnetic disk apparatus 3, or read out data recorded in a magnetic disk. Although, in the present embodiment, only one computer is connected to the loop, plural computers may be used.

The host computer 2 and each of the magnetic disk apparatuses 3 are provided with ports $6^1$ and $6^2$. The port $6^1$ is connected to the loop $1^1$ and the port $6^2$ is connected to the loop $1^2$. In the port $6^k$, a driver $4^k$ and a receiver $5^k$ are provided (here, k denotes 1 or 2). The host computer 2 and each of the magnetic disk apparatuses 3 are connected in a loop-like form with its own driver $4^k$ being connected to the receiver $5^k$ of the port $6^k$ of the apparatus in the following stage. In the present embodiment, each apparatus is provided with two ports and two systems of loops are formed accordingly.

A by-pass circuit $7^k$ is additionally provided corresponding to each port $6^k$. Each of the by-pass circuit $7^k$ selects, in response to a loop enable signal generated by a hard disk controller (HDC) (not shown in this Figure) of the magnetic disk apparatus 3, either a signal sent from the apparatus in the preceding stage, or a signal output by its own driver, as a signal to be sent to the apparatus in the following stage.

The magnetic disk apparatus 3 has a dedicated terminal (not shown) for each system of loop for sending out a loop enable signal, and the loop enable signal sent out from the terminal is transmitted via a dedicated signal line $8^k$ to the by-pass circuit $7^k$. When a fault occurs in a magnetic disk apparatus 3, the HDC of the relevant magnetic disk apparatus 3 detects the fault and cancels the loop enable signal. In response to this, the by-pass circuit $7^k$ selects the signal sent from the apparatus in the preceding stage, and thereby by-passes the magnetic disk apparatus 3 in which the fault occurs and disconnects it from the loop $1^k$.

Figure 3:
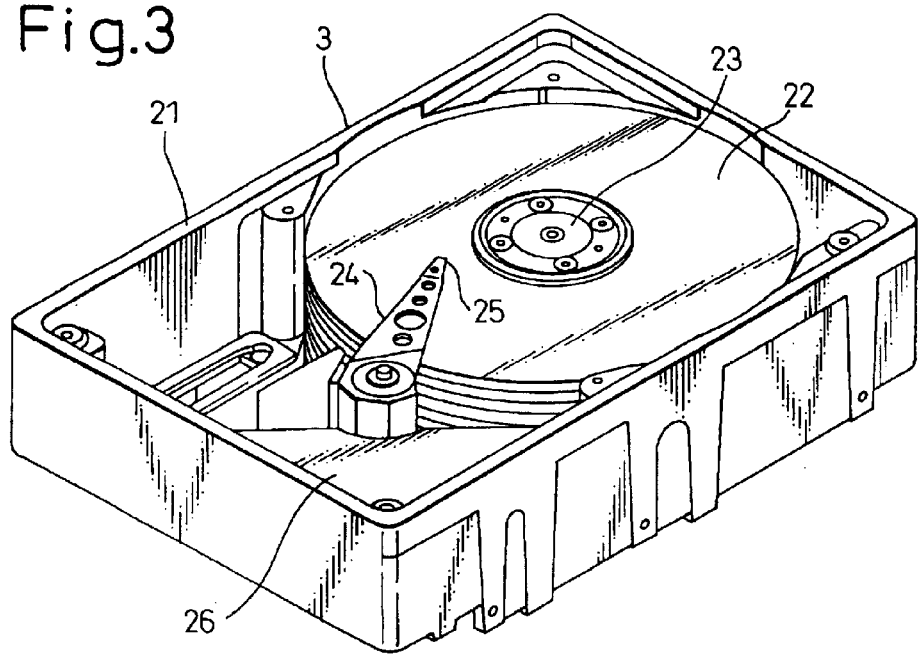
FIG. 3 is a perspective view showing a magnetic disk apparatus with its cover removed.
Figure 4:
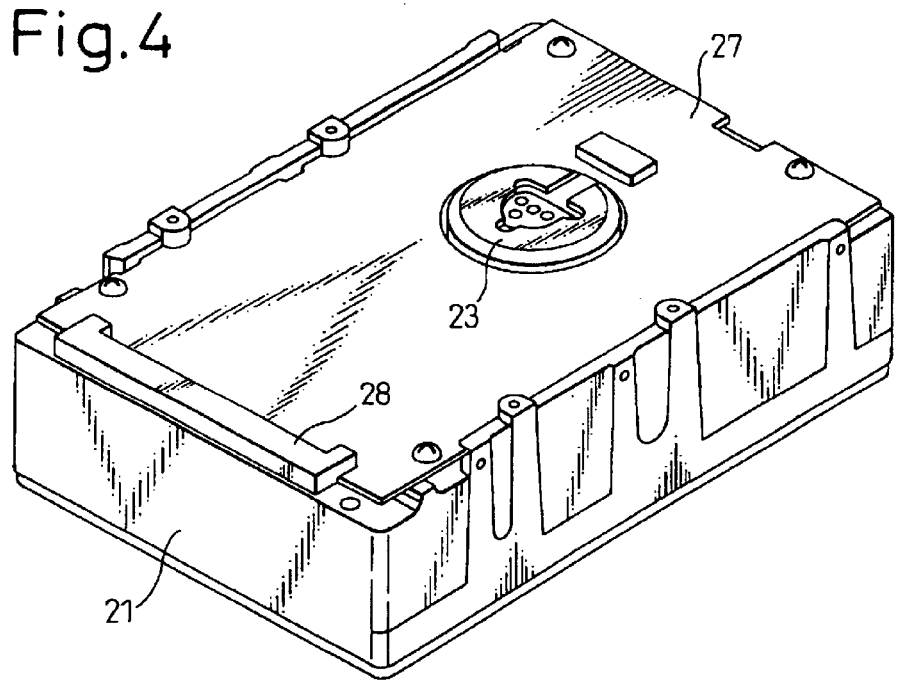
FIG. 4 is a perspective view showing rear side of the housing of the magnetic disk apparatus.

FIG. 3 is a perspective view showing the magnetic disk apparatus shown in FIG. 2 with its cover removed, and FIG. 4 is a perspective view showing the rear side of the magnetic disk apparatus.

In the base 21 of the magnetic disk apparatus 3, there are contained a magnetic disk 22 for storing magnetic data, a spindle motor (SPM) 23 for rotary driving of the magnetic disk 22, and an actuator 25 etc.

The actuator 25 is supported on a rotating axis on the base 21, and has a magnetic head 24 mounted on one end thereof for writing data into the magnetic disk 22 or reading out data stored in the magnetic disk 22, and has a coil (not shown) mounted on the other end thereof. The magnetic head 24 is driven on the magnetic disk 22 in the radial direction of the magnetic disk 22.

On the base 21, there is also provided a magnetic circuit 27 constructed of a permanent magnet and a yoke, and the above-described coil is disposed in the magnetic gap of the magnetic circuit 27. A voice coil motor (VCM) for rotating the actuator 25 is composed of the magnetic circuit 27 and the coil.

As shown in FIG. 4, a printed circuit board 27 is mounted on the rear side of the base 21. Chips such as a hard disk controller (HDC) and a read channel (RDC) and the like to be described later, and a connector 28 for interfacing with the host computer 2, are mounted on the printed circuit board 27. The interior of the base 21 and the printed circuit board 27 are electrically connected with each other, via an FPC (not shown).

The magnetic disk apparatus 3 is connected, via the above mentioned connector 28, to a back panel (not shown), and sends and receives data to and from the host computer and other magnetic disk apparatus 3 via the loops $1^1$, $1^2$. The by-pass circuits $7^1$, $7^2$ and the signal lines $8^1$, $8^2$ are provided not on the magnetic disk apparatus 3 but on the back panel. Terminals for taking in and sending out data from and to the loop $1^k$, and terminals for sending out a loop enable signal to the signal line $8^k$ are provided on the connector 28. The magnetic disk apparatus 3 connected to the back panel is not restricted to a single unit, but may comprise plural units connected to the loop.

Figure 5:
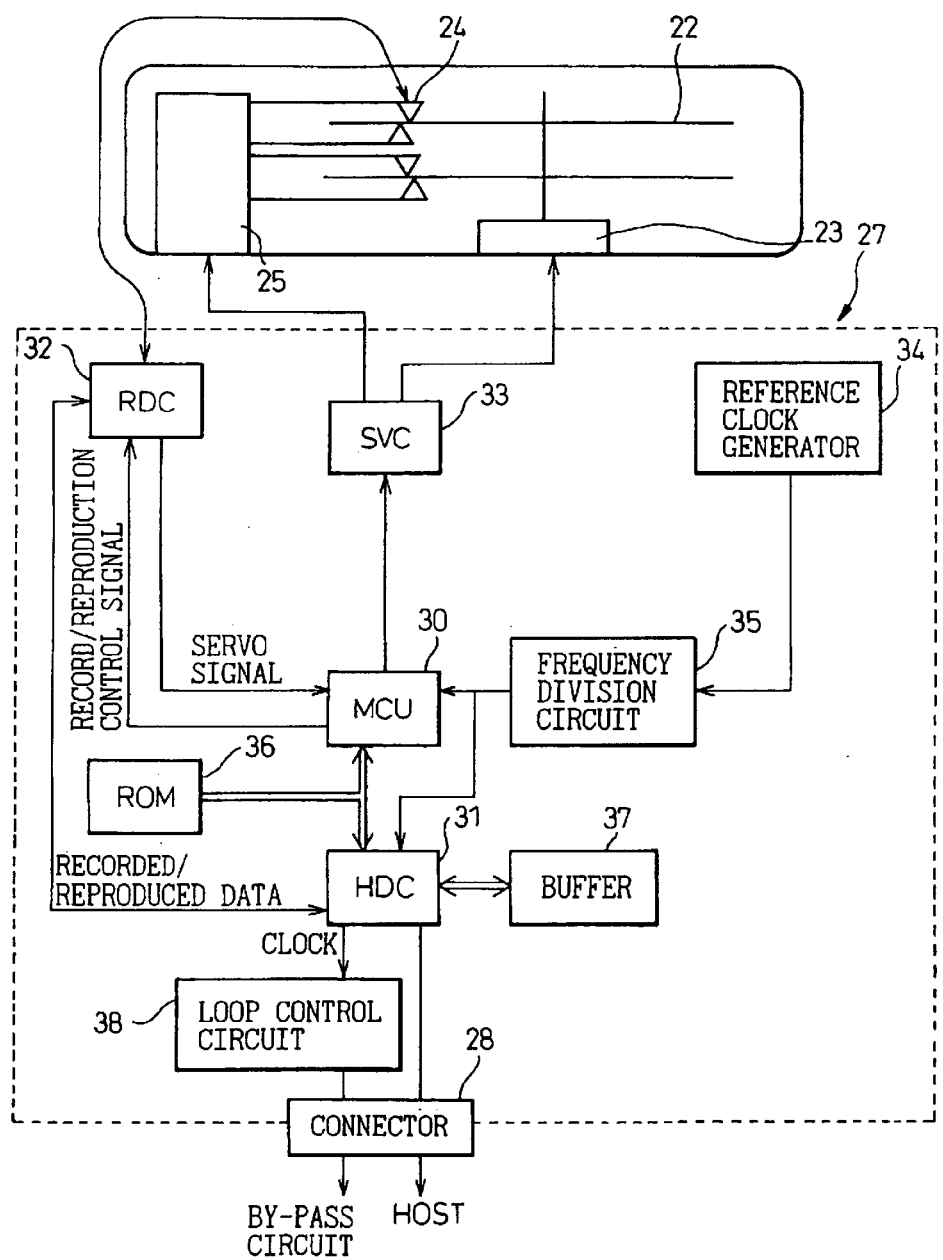
FIG. 5 is a block diagram showing components mounted on the printed circuit board.

FIG. 5 is a block diagram showing the components mounted on the printed circuit board.

On the printed circuit board 27, there are mounted a micro-controller (MCU) 30, a hard disk controller (HDC) 31, a read channel (RDC) 32, a servo-controller (SVC) 33, a reference clock generator 34, a read-only memory (ROM) 36 and the like, each constructed as a separate chip. Two or more of the MCU 30, HDC 31 and RDC 32 may be combined into one chip.

The MCU 30 is constructed of a micro-processor (MPU). The MCU 30 executes the program stored in the ROM 36, and recognizes the position information of the magnetic head 24 sent from the RDC 32, to be described later, controls the driving current of the VCM or SPM 23, and performs servo-control for the positioning of the magnetic head 24.

The HDC 31 performs the control of interfacing with the host computer 2 (e.g., the control for sending out a command to or receiving data from the host computer 2), and generates a control signal within the magnetic disk apparatus 3 for controlling the recording/reproducing format on the magnetic disk 22. The HDC 31 also monitors the presence/absence of an abnormality in the magnetic disk apparatus 3, and generates a loop enable signal for controlling connection/disconnection of the relevant magnetic disk apparatus 3 to and from the loop.

The RDC 32 comprises a modulation circuit for recording write-data sent from the host computer 2 to the magnetic disk 22, and a demodulation circuit for reproducing read-data read out from the magnetic disk 22 and the servo signal.

The SVC 33 is composed of a power amplifier for supplying the driving current to the VCM, and a power amplifier for supplying the driving current to the SPM 23, and supplies the driving current to SPM 23 and VCM in accordance with the instruction from the MCU 30.

The reference clock generator 34 in the present embodiment is constructed of a quartz oscillator, and generates the reference clock. The frequency of the reference clock generated by the reference clock generator 34 is divided to 1/N of the frequency value in a frequency division circuit 35, and provides the operation clock signal for the MCU 30 and the HDC 31.

The read-only memory (ROM) 36 stores programs and the like which are to be executed by the MCU 30 and the HDC 31.

The data buffer 37 temporarily stores data to be sent to the host computer 2 or data received from the host computer 2.

The loop control circuit 38 that constitutes the connection control circuit of the present invention, detects the level of the clock signal output from the HDC 36, and sends out the control signal depending on the detected level via the signal line $8^k$ to the by-pass circuit $7^k$. When the level of the clock signal indicates abnormality, it sends out the control signal for disconnecting the magnetic disk apparatus 3 from the loop.

Figure 6:
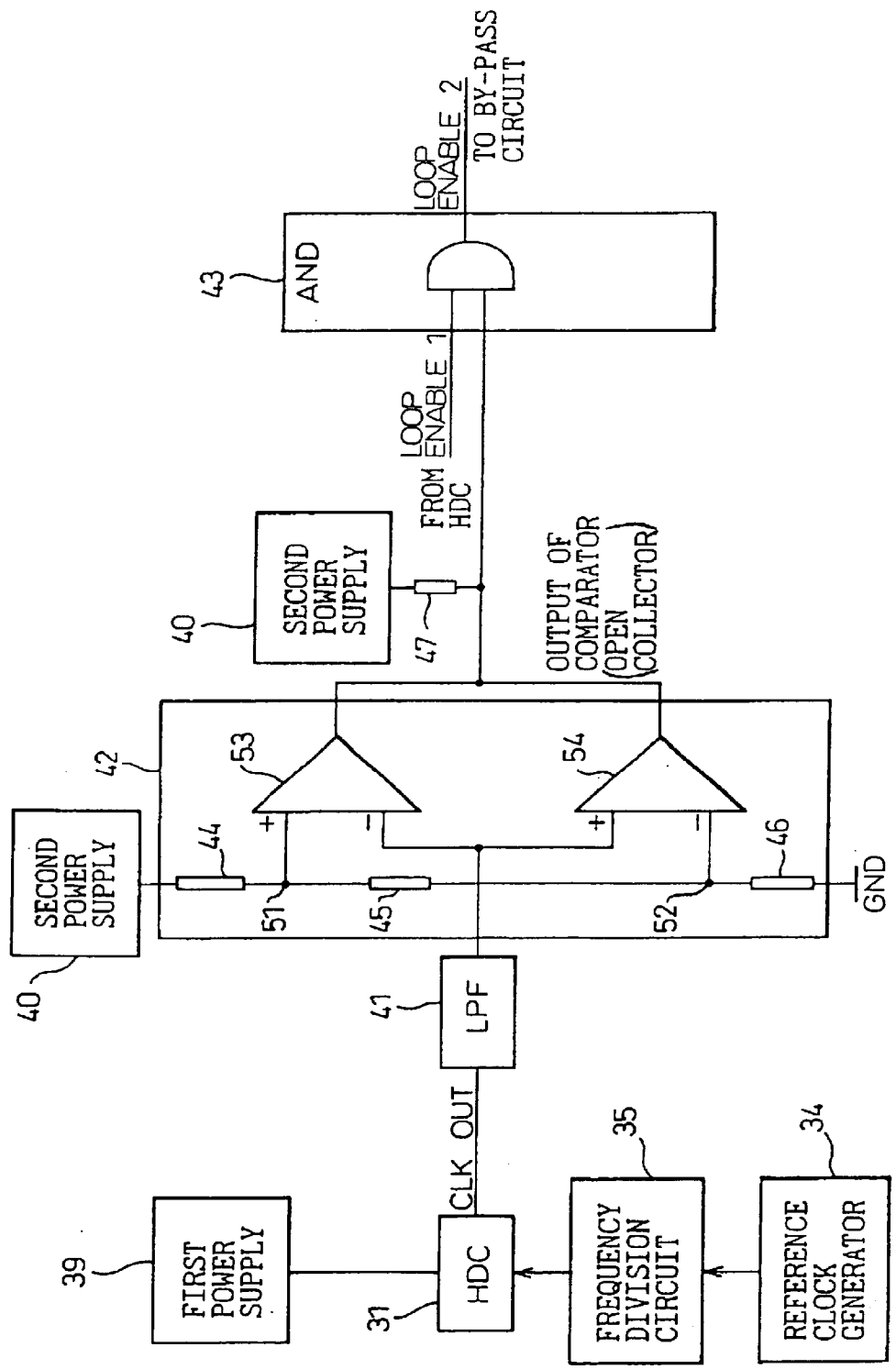
FIG. 6 is a circuit diagram showing a loop control circuit according to an embodiment of the present invention.

FIG. 6 is a circuit diagram showing the loop control circuit according to an embodiment of the present invention.

The loop control circuit 38 of the present invention is, as shown in FIG. 5, provided on the print circuit board 27 as a unit separate from the HDC 31. The loop control circuit 38 is largely composed of a low pass filter 41 for smoothing (to DC) of the clock signal output from the HDC 31, a comparator 42 for comparing the smoothed output with a threshold voltage, and an AND circuit 43 that gives a logical product of loop enable 1 signal output from the HDC 31 and the output of the comparator 42.

In a state in which the HDC 31 outputs a normal clock signal, the clock signal is output after passing through the low pass filter 41 as a DC signal having about half the level of the voltage of the power supply (that is, the first power supply) 39. However, when the generator 34 fails, the clock signal may not be output from the HDC 31 or the clock signal having a frequency deviated from the normal value may be output, and as a result, a DC signal at a level indicating the occurrence of an abnormal event is output from the low pass filter 41. Also, when the power supply 39 fails, the clock signal may not be output from the HDC 31 or the clock signal having a level deviated from the normal value may be output and, as a result, the DC output from the low pass filter 41 may exhibit a too high or too low level.

The comparator 42 has two voltage division points (a high level side voltage division point 51 and a low level side voltage division point 52), in which the voltage of the power supply (that is, the second power supply) 40 is divided by a plurality of resistors 44 to 46. The voltage at the high level side voltage division point 51 and output level of the low pass filter 41 is compared by a high level detection circuit 53, and the voltage at the low level side voltage division point 52 and output level of the low pass filter 41 is compared by a low level detection circuit 54. The comparator 42 outputs the signal at high level when output level of the filter 41 is between the voltage at the high level side voltage division point 51 and the voltage at the low level side voltage division point 52, and outputs the signal at low level when output level of the filter 41 is either higher than the voltage at the high level side voltage division point 51 or lower than the voltage at the low level side voltage division point 52.

The values of the voltage dividing resistance are set so that, when a normal clock signal is output from the HDC 31, that is, when the level of the output signal from the low pass filter 41 is about half the voltage of the power supply 39, the comparator 42 outputs the signal at high level. For example, if the voltage of the power supply is 3.3 V, half the value is 1.65 V, so that, allowing for a sufficient margin, the values of resistances 44 to 46 are chosen such that the voltage at high voltage division side is about 2.2 V and the voltage at low voltage division side is about 1.3 V.

In other words, when the clock output of the HDC 31 indicates an abnormality due to a trouble in the power supply 39 or the generator 34, that is, when the output of the low pass filter is too high or too low, the comparator 42 outputs a signal at low level.

The AND circuit 43 gives a logical product of the output signal from the comparator 42 and loop enable 1 signal generated by the HDC 31. The output signal from the AND circuit 43 is output as a loop enable 2 signal from the output terminal (not shown) provided in the connector 28 to the signal line $8^k$, and transmitted to the by-pass circuit $7^k$.

When trouble occurs in the generator 34 or the power supply 39 and the HDC 31 cannot function normally, the loop enable signal output from the HDC 31 is fixed either to a high level or to a low level. Conventionally, when the loop enable signal deviates to a low level, the loop enable signal is cancelled and the magnetic disk apparatus 3 can be disconnected from the loop. However, when the loop enable signal is fixed to a low level, the magnetic disk apparatus cannot be cancelled, and unexpected data may be transferred from the defective magnetic disk apparatus to other magnetic disk apparatuses connected to the loop, leading to breakdown of the loop.

In the present embodiment, on the other hand, when failure occurs in the generator 34 or the power supply 39 and the HDC 31 cannot function normally, an abnormality can be recognized from the clock signal output from the HDC 31. As described before, when an abnormality is recognized in the clock signal, the comparator 42 outputs a low level signal so that, irrespective of whether loop enable 1 signal is fixed to a high level or to a low level, the AND circuit 43 outputs loop enable 2 signal at a low level to the signal line $8^k$, and the magnetic disk apparatus can be disconnected from the loop.

When both generator 34 and the power supply 39 are normal and the HDC 31 outputs a normal clock signal, the loop enable 1 signal exhibits a high level. The output of the comparator is also at high level, as described before. As a result, the AND circuit 43 outputs the loop enable 2 signal at a high level. In this state, the magnetic disk apparatus 3 continues to be connected to the loop.

In the loop control circuit 38 as shown in the present embodiment, in order to be able to recognize an abnormality of the output clock signal from the HDC 31 caused by an abnormality of the power supply 39, the power supply 39 for supplying power to the HDC 31 and the power supply 40 for supplying power to the comparator 42 are constructed as separate circuits. The output voltage is the same for both power supplies. If the two are constructed as the same and one power supply, failure of power supply to the HDC 31 means failure of power supply to the comparator 42 so that the comparator 42 no longer functions normally and an abnormality of the clock signal output from the HDC 31 cannot be detected.

As has been described in the foregoing, according to the preferred embodiments of the present invention, even if the controller itself of an information storage apparatus cannot function normally due to an abnormality of the reference clock or an abnormality of the power supply, a connection control circuit can recognize the abnormality and disconnect the information storage apparatus from the transmission line, and therefore, other apparatuses connected to the transmission line are not affected by the above-mentioned abnormality, and a system with high reliability can be thereby provided.

I claim:

1. A connection control circuit which controls connection and disconnection of an information storage apparatus to and from a transmission line, said connection control circuit comprising a comparator which compares the level of a given signal generated in accordance with a state of an occurrence of an operating clock signal of a controller of said information storage apparatus with a threshold level and, in accordance with a result of the comparison, generates a connection control signal for connection or disconnection of said information storage apparatus to or from the transmission line.

2. A connection control circuit according to claim 1, wherein said connection control circuit comprises a low pass filter for smoothing said operating clock signal of said controller in a stage preceding said comparator.

3. A connection control circuit according to claim 1, wherein an operating power supply for said controller is different from an operating power supply for said comparator.

4. A connection control circuit which controls connection and disconnection of an information storage apparatus to and from a transmission line wherein, when said connection control circuit detects that a range of a level of a given signal generated in accordance with a state of an occurrence of an operating clock signal of a controller of said information storage apparatus has been deviated from a predetermined range, due to an abnormality in said operating clock signal of said controller of said information storage apparatus or an abnormality in a power supply, said connection a control circuit that outputs a control signal for disconnecting the information storage apparatus from a loop of said transmission line.

5. An information storage apparatus comprising:

an interface unit for inputting and outputting data from and to a transmission line;

a storage medium for storing said data;

a head for reading out or writing information from or into said storage medium;

a controller for performing positioning control of said head relative to said storage medium; and a connection control circuit for outputting a control signal, to disconnect said interface unit from said transmission line, when it is detected that a range of a level of a given signal generated in accordance with a state of an occurrence of an operating clock signal of said controller has been deviated from a predetermined range, due to an abnormality in said operating clock signal of said controller or an abnormality in a power supply.

* * * * *